United States Patent
Retallick et al.

(10) Patent No.: US 7,686,325 B2
(45) Date of Patent: Mar. 30, 2010

(54) GAS GENERATOR AND DEVICE FOR ELECTRICALLY CONTACTING A GAS GENERATOR

(75) Inventors: David Retallick, Munsterhausen (DE); Jens Eckle, Pfaffenhofen (DE); Martin Schwann, Blaustein (DE); Lothar Maurer, Blaubeuren (DE)

(73) Assignee: Takata-Petri AG, Aschaffenburg (DE)

( * ) Notice: Subject to any disclaimer, the term of this patent is extended or adjusted under 35 U.S.C. 154(b) by 690 days.

(21) Appl. No.: 10/516,028

(22) PCT Filed: May 23, 2003

(86) PCT No.: PCT/DE03/01732

§ 371 (c)(1),
(2), (4) Date: Aug. 4, 2005

(87) PCT Pub. No.: WO03/101789

PCT Pub. Date: Dec. 11, 2003

(65) Prior Publication Data

US 2006/0087105 A1 Apr. 27, 2006

(30) Foreign Application Priority Data

May 28, 2002 (DE) .................... 102 23 829

(51) Int. Cl.
B60R 21/16 (2006.01)

(52) U.S. Cl. .............. 280/728.2; 102/202.1; 439/95; 439/108

(58) Field of Classification Search ........... 280/728.2; 102/202.1, 202.14; 439/95–98, 101, 108
See application file for complete search history.

(56) References Cited

U.S. PATENT DOCUMENTS

| | | | | | |
|---|---|---|---|---|---|
| 1,941,905 | A | * | 1/1934 | Mair | 174/78 |
| 2,309,978 | A | * | 2/1943 | Pratt | 102/531 |
| 2,420,880 | A | * | 5/1947 | Hetherington | 200/535 |
| 3,274,937 | A | * | 9/1966 | Kyle | 102/202.7 |
| 3,314,361 | A | * | 4/1967 | Olson al. | 102/218 |
| 3,557,699 | A | * | 1/1971 | Hubbard | 102/202.9 |
| 3,728,472 | A | * | 4/1973 | Leuteritz et al. | 174/78 |
| 4,306,499 | A | * | 12/1981 | Holmes | 102/202.4 |
| 4,625,645 | A | * | 12/1986 | Williams | 102/202.14 |
| 4,896,898 | A | * | 1/1990 | Lenzen et al. | 280/735 |
| 5,288,242 | A | * | 2/1994 | Muzslay | 439/349 |
| 5,371,333 | A | | 12/1994 | Kanai et al. | |
| 5,449,302 | A | * | 9/1995 | Yarbrough et al. | 439/680 |
| 5,573,411 | A | * | 11/1996 | Bartosz et al. | 439/95 |

(Continued)

FOREIGN PATENT DOCUMENTS

CH 692 367 A5 5/2002

(Continued)

*Primary Examiner*—Paul N Dickson
*Assistant Examiner*—Drew Brown
(74) *Attorney, Agent, or Firm*—Foley & Lardner LLP

(57) ABSTRACT

A gas generator for filling an airbag of a vehicle is provided. The gas generator can be integrated into the vehicle in such a way that it is electrically insulated from the same, and can be directly connected to the electrical ground of the vehicle, especially to a defined ground potential, by means of a separate ground connection. The separate ground connection thus provides an improved ground connection of the gas generator.

17 Claims, 2 Drawing Sheets

U.S. PATENT DOCUMENTS

| | | | |
|---|---|---|---|
| 5,672,841 A * | 9/1997 | Monk et al. | 102/202.4 |
| 6,056,319 A * | 5/2000 | Ruckdeschel et al. | 280/741 |
| 6,082,758 A | 7/2000 | Schenck | |
| 6,276,953 B1 | 8/2001 | Gauker et al. | |
| 6,283,506 B2 * | 9/2001 | Patrickson et al. | 280/741 |
| 6,358,069 B2 * | 3/2002 | Yoshioka et al. | 439/108 |
| 6,805,377 B2 * | 10/2004 | Krupp et al. | 280/741 |
| 6,964,579 B2 * | 11/2005 | Seminara et al. | 439/352 |
| 7,160,149 B1 * | 1/2007 | Chawgo | 439/578 |
| 7,267,560 B2 * | 9/2007 | Akino | 439/101 |
| 2005/0037657 A1 * | 2/2005 | Shemtov | 439/363 |

FOREIGN PATENT DOCUMENTS

| | | |
|---|---|---|
| DE | 43 17 737 A1 | 12/1993 |
| DE | 197 08 307 C1 | 6/1998 |
| DE | 299 00 590 U1 | 3/1999 |
| EP | 1 035 400 A2 | 9/2000 |
| GB | 2 281 608 A | 3/1995 |
| JP | 5-94032 | 12/1993 |
| JP | 11-283691 | 10/1999 |

* cited by examiner

GAS GENERATOR AND DEVICE FOR ELECTRICALLY CONTACTING A GAS GENERATOR

BACKGROUND

The invention relates to a gas generator for filling an airbag for a motor vehicle and to a device for making electrical contact with a gas generator.

Gas generators in motor vehicles serve the purpose of inflating airbags, as required, i.e. in particular in the case of an accident. The gas generator is in this case generally activated by means of an electrical signal and is grounded to the ground potential of the vehicle. With known gas generators, used for grounding purposes are the fixing means, by means of which the gas generator or its housing is fixed to the vehicle. These electrically conductive fixing parts are used to connect the gas generator to a likewise electrically conductive vehicle part, in particular a body part or a metallic part of a motor vehicle seat. This connection provides the contact between the gas generator housing and the ground potential of the vehicle. The reliability of the grounding or connection to the ground potential produced in this manner is dependent on a large number of external factors, such as the occurrence of leakage currents or the correct mounting of the respective fixing part, for example. It is also possible for there to be multiple groundings which make defined grounding of the gas generator to a unique ground potential impossible. Furthermore, two or more gas generators which are arranged at different points in the vehicle are connected to different ground potentials of the vehicle, since the ground potential may assume different values at different points of the motor vehicle, for example, owing to the occurrence of leakage currents.

DE 43 17 737 A1 describes a gas generator for filling an airbag. The gas generator is installed in the vehicle such that it is electrically connected to a hooter switch. The gas generator is connected to the negative pole of the battery via a socket and a steering shaft, to which the hooter switch is also connected.

It is therefore the object of the invention to specify an improved ground connection for gas generators.

SUMMARY

Accordingly, the gas generator can be installed such that it is electrically insulated with respect to the vehicle and can be connected directly to the electrical ground of the vehicle, in particular to a defined connection. The electrical insulation of the gas generator with respect to the vehicle and the connection to a defined ground potential means that the gas generator is at a defined ground potential. Even when a large number of gas generators are used which are installed at different points in the vehicle, a ground potential which is identical for all of the gas generators can be prescribed, since the ground potential does not depend on the installation location.

A direct connection of the ground connection of the gas generator is in this case understood to mean that the ground connection is connected to a prescribed ground potential directly. This may be achieved, for example, by means of an electrical line between the gas generator and the point of the vehicle defining the ground potential, in particular one pole of the vehicle battery. The ground connection is thus in particular not produced using vehicle seats, body parts or mechanical fixing means.

Connecting the gas generator housing by means of the separate ground connection to the electrical ground of the vehicle is advantageous since the known gas generators have been connected to ground via the gas generator housing of the gas generator. These gas generators can thus still be used.

Simple installation is achieved by it being possible for the ground connection to be clamped in between the gas generator housing and an ignition plug such that the ground connection is in contact with the gas generator housing. When connecting the ignition plug to the gas generator, at the same time a defined ground connection of the gas generator housing can thus be produced by clamping the ground connection. This can be achieved in a single working step by inserting the ignition plug. Furthermore, owing to the clamping of the ground connection between the ignition plug and the gas generator housing, no further connection for the ground connection is required, with the result that the usual design principle of known gas generators can be maintained. Reliable connection of the ground connection to the gas generator is achieved by it being possible for the ignition plug to be latched onto the gas generator and/or the gas generator housing. This prevents the ignition plug or the ground connection clamped between the ignition plug and the gas generator housing from being released owing to mechanical vibrations. However, simple installation is made possible by the latching of the plug connection.

In order to make contact in a simple manner with the gas generator housing when the ground connection is clamped between the gas generator housing and an ignition plug, the ground connection has an annular contact region which serves the purpose of making contact with the gas generator housing. The annular contact region may comprise, for example, a contact region of the ignition plug, but may at the same time have smaller dimensions than the remainder of the housing of the ignition plug. By this means both the contact region of the ignition plug and the ground connection can be brought into contact with the gas generator at the same time. It is possible for reliable contact to be made with the gas generator housing in the annular contact region by the annular contact region being resilient or in the form of a spring disk. Even manufacturing tolerances or an ignition plug which is inserted such that it does not exactly fit or which is not completely inserted can be compensated for by the resilient, annular contact region, in which case the resilient, annular contact region also stresses the ignition plug with respect to the gas generator housing and thus prevents rattling, for example.

Simple electrical insulation of the gas generator with respect to the vehicle can be achieved by the gas generator housing being electrically insulating on its outer side and, in particular, having a coating for the purpose of electrically insulating it with respect to the vehicle. When such an electrical insulation is used on the outer side of the gas generator housing, the otherwise conventional, electrically conductive fixing parts can still be used for the purpose of fixing the gas generator to the vehicle. However, the gas generator is then electrically insulated with respect to the vehicle.

In order to insulate the gas generator with respect to the vehicle, an electrically insulating fixing device may also be used which is, in particular, at least partially made of an electrically insulating material or has an insulating region.

It is also possible to connect the gas generator directly to the electrical ground of the vehicle by means of a plug connection. A plug connection has the conventional advantages that it is a secure connection and that it is easy to handle. In one advantageous embodiment, the ground connection is integrated in an ignition plug.

The object is further achieved by a device for making electrical contact with a gas generator.

Accordingly, the device has an ignition plug for making electrical contact with an ignition device of a gas generator, a separate ground connection being provided for the purpose of directly connecting the gas generator to the electrical ground of the vehicle, in particular to a defined ground potential. The device thus at the same time serves the purpose of making contact with the ignition device of the gas generator by means of the ignition plug, and also serves the purpose of producing a direct connection between the gas generator and the ground potential of the vehicle.

The ground connection is advantageously produced between the gas generator housing of the gas generator and the electrical ground of the vehicle. In this case, in turn, as is described above, the ground connection can be clamped in between the ignition plug and a gas generator housing such that the ground connection is in contact with the gas generator housing. For simple installation and cost-effective production, it is possible for the ground connection to have an annular contact region which may also be, in particular, resilient or in the form of a spring disk. It is thus possible to produce a reliable connection between the ground connection and the gas generator housing.

The invention has the advantage that a gas generator or the gas generator housing is connected in a reliable manner to the ground potential of the vehicle. In this case, in each case only one single, defined grounding path is provided, with the result that the risk of multiple groundings and thus the risk of potentials which are not uniquely defined are eliminated. This provides a functionally reliable unit.

BRIEF DESCRIPTION OF THE DRAWINGS

The invention will be explained by way of example in the text which follows with reference to the drawings of the figures, in which.

DETAILED DESCRIPTION

Figure 1:
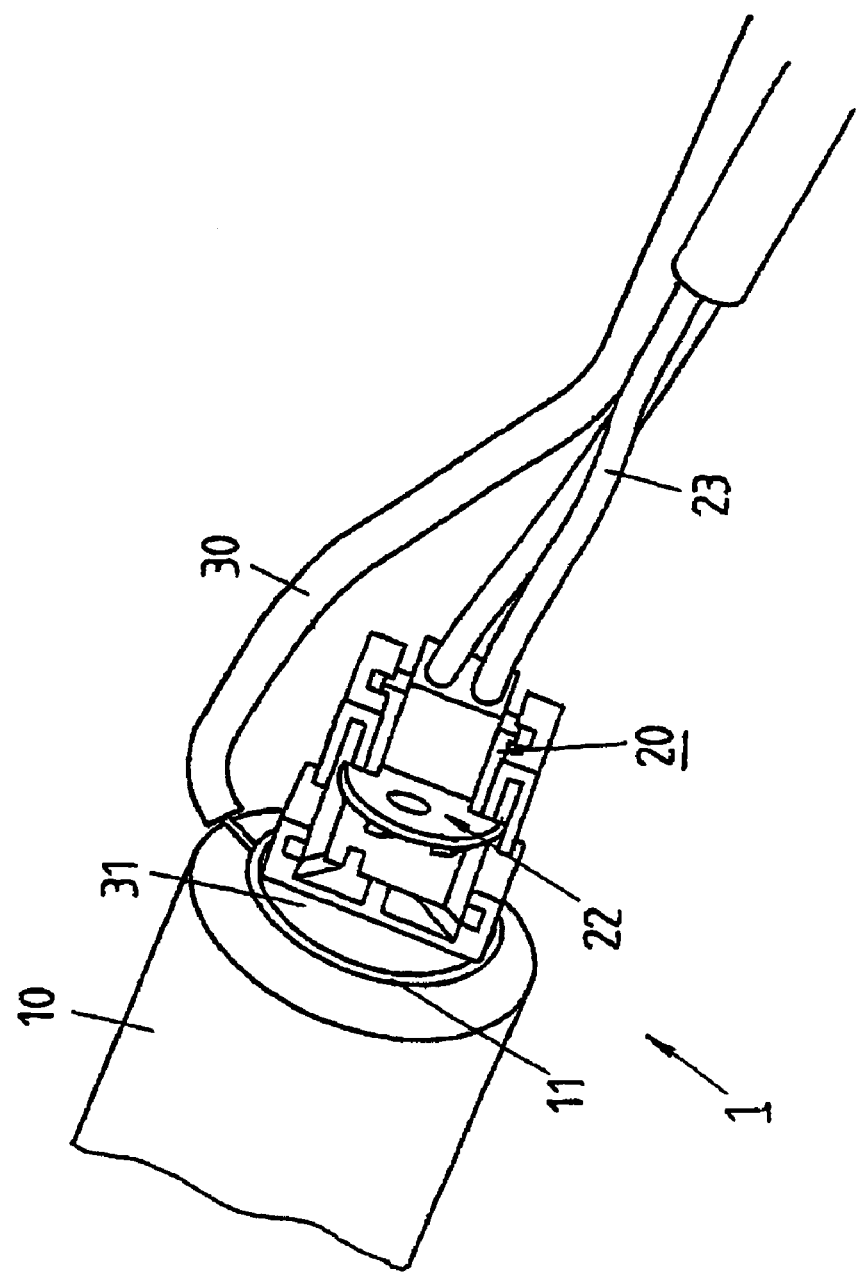
FIG. 1 shows a perspective view of a gas generator according to the invention having an ignition plug and a ground connection having an annular contact element.

FIG. 1 shows a gas generator 1 having a gas generator housing 10. This gas generator 1 can be connected, via fixing means (not shown here), to vehicle parts (likewise not shown) of the vehicle. The insulation of the gas generator 1 from the vehicle is achieved by means of an insulating coating of the gas generator housing 10.

Electrical contact is made with the ignition device (not shown here), which is located in the interior of the gas generator 1 and by means of which the gas generator 1 is activated, via an ignition plug 20. FIG. 1 shows the ignition plug 20 in a position in which it is connected to the gas generator 1, the ignition device being in electrical contact with the respective ignition lines 23. A latching mechanism 22 serves the purpose of fixedly latching the ignition plug 20 onto the gas generator 1.

Figure 2:
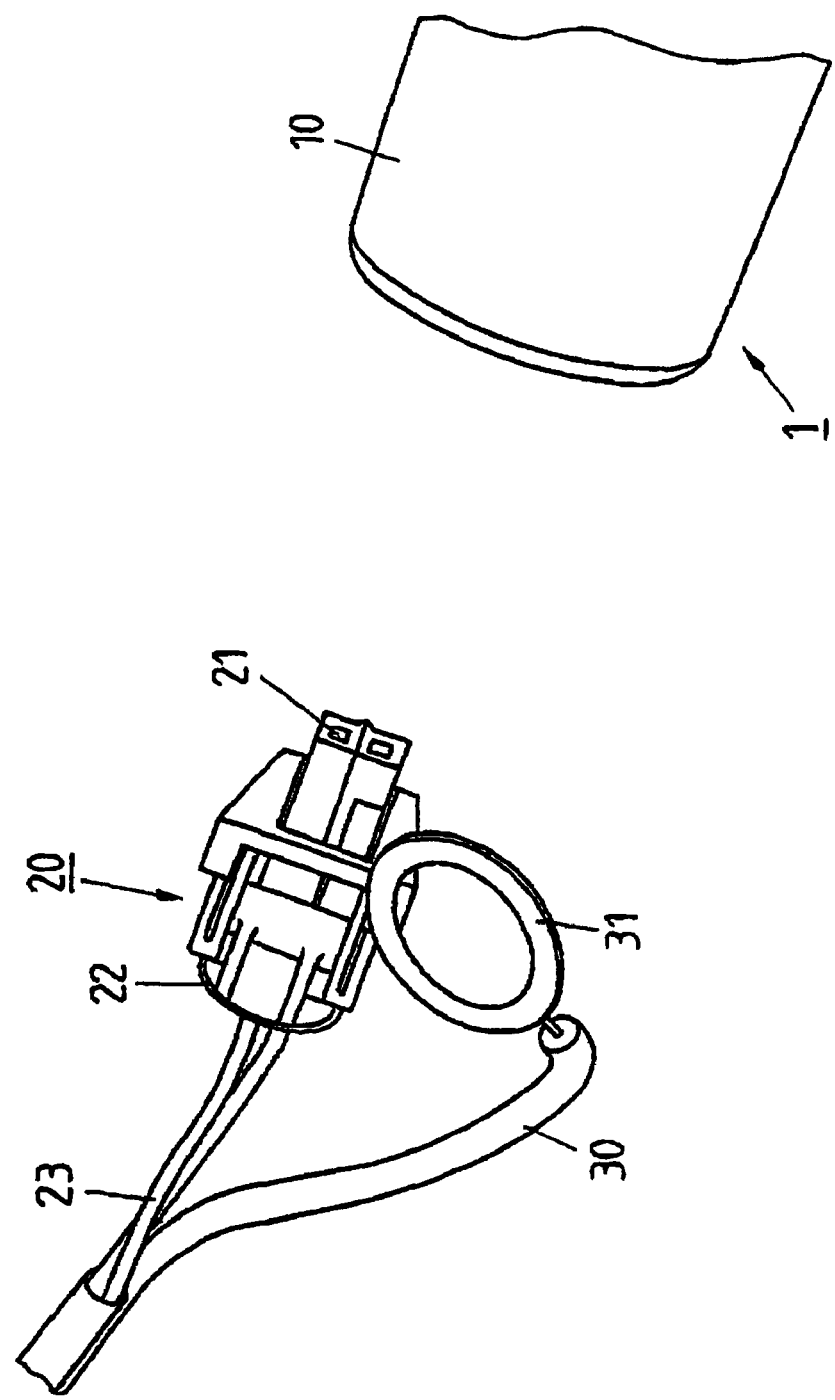
FIG. 2 shows a perspective view of the gas generator according to the invention shown in FIG. 1, the ignition plug and the ground connection being separate from the gas generator.

Arranged between the housing of the ignition plug 20 and the gas generator housing 10 is an annular contact region 31 of the ground connection 30. As is shown in FIG. 2, the ignition plug 20 and the annular contact region 31 of the ground connection 30 are separate components. The annular contact region 31 of the ground connection 30 is clamped in between the housing of the ignition plug 20 and the gas generator housing 10 by connecting the ignition plug 20 to the gas generator 1. The gas generator housing 10 does not have an insulating layer in this contact region, with the result that the annular contact region 31 is in direct contact with the gas generator housing 10. The housing of the ignition plug 20, on the other hand, is made of an insulating material, with the result that a ground contact is produced between the ground connection 30 and the gas generator housing 10 by the annular contact element 31 being clamped in.

Reliable contact is made between the annular contact region 31 and the gas generator housing 10 by the annular contact region 31 being resilient. The annular contact region 31 is thus latched, with the resilient, annular contact region 31 being subjected to spring prestress, by the ignition plug 20 being pressed on and the latching device 22 of the ignition plug 20 subsequently being latched. This ensures that the annular contact region 31 is also in reliable contact with the gas generator housing 10 even if the ignition plug is subjected to relatively high tolerances.

The ground connection 30 is connected on a central potential rail (not shown here) which defines the ground potential of the vehicle. The gas generator 1 is therefore connected to the ground potential of the vehicle directly and exclusively by means of the ground connection 30.

FIG. 2 shows the contact region 21 of the ignition plug 20 which is connected to a corresponding contact region (not shown) of the gas generator 1.

FIG. 2 shows the ignition plug 20 once again when it is separated from the gas generator housing 10. The ground connection 30 has an annular contact region 31 which is resilient. The ignition plug 20 is passed through the annular contact region 31 of the ground connection 30 for the purpose of connecting it to the gas generator housing 10. In this case, the diameter of the annular contact region 31 is selected such that parts of the housing of the ignition plug 20 protrude beyond the annular contact region 31. Housing parts of the ignition plug 20 thus fixedly clamp the annular contact region 31 between the housing parts of the ignition plug 20 and the gas generator housing 10 when the ignition plug 20 is connected to the gas generator housing 10 or to a plug receptacle arranged thereon. By this means, the annular contact region 31 of the ground connection 30 is clamped directly onto the gas generator housing 10 and direct contact is made between the two.

What is claimed is:

1. A gas generator for filling an airbag in a vehicle comprising:
   a gas generator housing, wherein the gas generator housing is electrically insulated with respect to the vehicle on an outer side of the gas generator;
   an ignition plug operatively connected to the gas generator housing; and
   a separate ground connection, clamped in between the ignition plug and the gas generator housing such that the separate ground connection comes into electrical contact with the gas generator housing in a non-insulated contact region on the gas generator housing's outer side,
   wherein the gas generator housing is directly connected to a defined ground potential of the vehicle by the separate ground connection.

2. The gas generator as claimed in claim 1, further comprising:
   a latching mechanism, wherein the ignition plug is latched onto both the gas generator and the gas generator housing or either the gas generator or the gas generator housing by the latching mechanism.

3. The gas generator as claimed in claim 1, wherein the ground connection has an annular contact region, it being possible for contact to be made between the annular contact region and the gas generator housing.

4. The gas generator as claimed in claim 3, wherein the annular contact region is resilient.

5. The gas generator as claimed in claim 4, wherein the annular contact region is a spring disk.

6. The gas generator as claimed in claim 1, wherein the gas generator housing is electrically insulated on its outer side.

7. The gas generator as claimed in claim 6, wherein the gas generator housing has a coating for electrically insulating it with respect to the vehicle.

8. The gas generator as claimed in claim 1, wherein the gas generator and/or the gas generator housing can be directly connected to the defined ground potential of the vehicle by a plug connection.

9. The gas generator as claimed in claim 8, wherein the plug connection makes electrical contact with an ignition device of the gas generator.

10. The device as claimed in claim 1, wherein the defined ground potential of the vehicle is an electrical pole of a vehicle battery.

11. The device as claimed in claim 10, wherein an electrical line connects the electrical pole of the vehicle battery to the gas generator housing.

12. A device for making electrical contact with a gas generator housing, wherein the gas generator housing is electrically insulated with respect to the vehicle on an outer side of the gas generator, comprising: an ignition plug, and a separate ground connection, clamped between the ignition plug and the gas generator housing such that the separate ground connection is in contact with the gas generator housing in a non-insulated contact region on the gas generator housing's outer side, wherein the separate ground connection directly connects the gas generator housing to a defined ground potential of a vehicle.

13. The device as claimed in claim 12, wherein the ground connection has an annular contact region, it being possible for contact to be made between said contact region and the gas generator housing.

14. The device as claimed in claim 13, wherein the annular contact region is resilient.

15. The device as claimed in claim 13, wherein the annular contact region is a spring disk.

16. The device as claimed in claim 12, wherein the defined ground potential of the vehicle is an electrical pole of a vehicle battery.

17. The device as claimed in claim 16, wherein an electrical line connects the electrical pole of the vehicle battery to the gas generator housing.

\* \* \* \* \*